United States Patent [19]
Rohs

[11] 3,744,353
[45] July 10, 1973

[54] METHOD AND MEANS FOR PREVENTING REGENERATIVE CHATTER IN A MACHINE TOOL, PARTICULARLY IN A LATHE

[76] Inventor: Hans Günther Rohs, 9 Richard-Wagner-strasse, 7324 Rechberghausen, Germany

[22] Filed: Aug. 13, 1971

[21] Appl. No.: 171,585

[30] Foreign Application Priority Data
Aug. 25, 1970  Germany.................. P 20 42 138.9

[52] U.S. Cl...................... 82/2 R, 82/1 R, 82/28 R, 82/DIG. 9
[51] Int. Cl....... B23b 3/00, B23b 7/00, B23b 19/02
[58] Field of Search....................... 82/DIG. 9, 2, 28, 82/1, DIG. 4

[56] References Cited
UNITED STATES PATENTS

| 3,504,581 | 4/1970 | Weichbratt et al. | 82/DIG. 9 |
| 3,590,670 | 7/1971 | Thompson et al. | 82/DIG. 9 |
| 3,473,435 | 10/1969 | Tse et al. | 82/DIG. 9 |
| 3,138,750 | 6/1964 | Borger et al. | 82/DIG. 9 |
| 3,095,532 | 6/1963 | Floyd | 82/DIG. 9 |

*Primary Examiner*—Harrison L. Hinson
*Attorney*—Shlesinger, Fitzsimmons & Shlesinger

[57] ABSTRACT

The invention relates to a method for suppressing regenerative chatter of the kind which occurs during the machining of workpieces by a tool of a machine tool, said method consisting of changing repeatedly the cutting speed of the tool whilst the latter machines the same surface of the workpiece, thereby making the frequency with which the waves or ripples on the surface which is being machined impact on the tool dissimilar to the inherent frequency of the mass system on which the cutting force acts, so that these waves or ripples when impacting on the tool do not increase the amplitude of the vibrations which product chattering. Moreover the invention relates to a machine tool for carrying out such method, more particularly to a lathe.

7 Claims, 1 Drawing Figure

Patented July 10, 1973
3,744,353
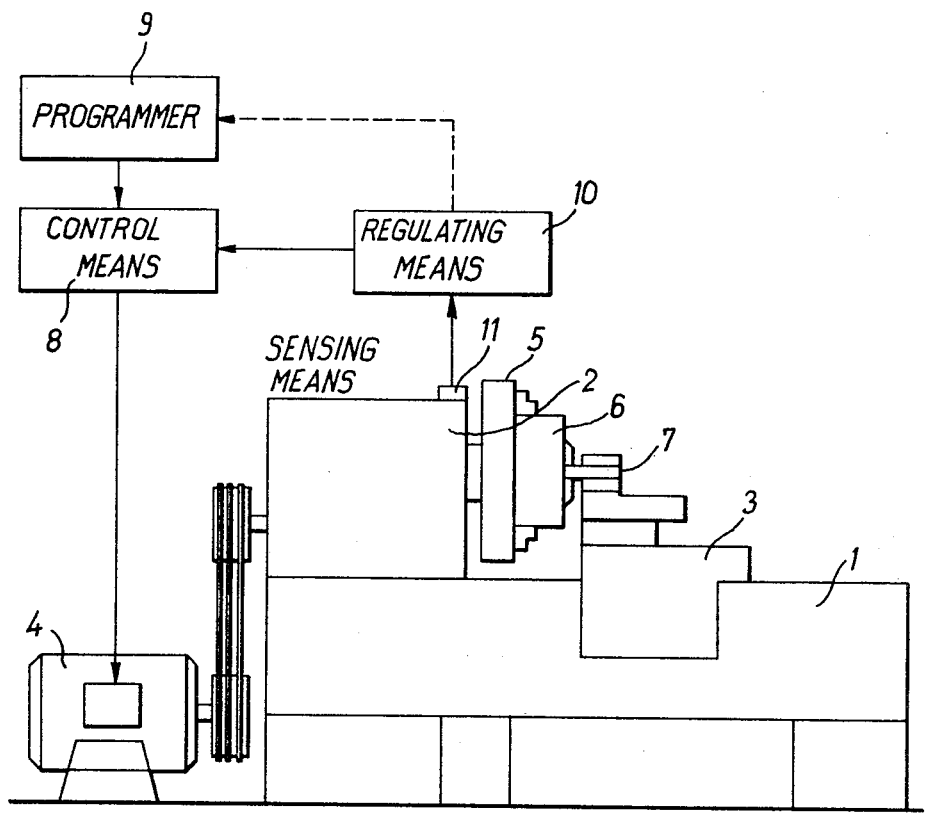
INVENTOR
Hans Günther Rohs
BY Shlesinger, Fitzsimmons & Shlesinger
ATTORNEYS

METHOD AND MEANS FOR PREVENTING REGENERATIVE CHATTER IN A MACHINE TOOL, PARTICULARLY IN A LATHE

This invention relates to a method and means for preventing regenerative chatter of the kind which occurs during the machining of workpieces in a machine tool. Regenerative chatter is produced when the tool of a machine tool makes successive runs over the surface of a workpiece whilst machining it and in doing so detaches a chip from that surface.

Regenerative chatter subjects a machine tool including its tool as well as the workpiece to heavy vibrations whereby tool life is shortened and the quality of the machined surfaces suffers. It arises in the following manner:

When the cutting edge of the tool of a machine tool moves over the surface of a workpiece and in contact therewith, vibrations are produced by a variety of reasons whose nature is in the present context immaterial and which result in a relative movement between that cutting edge and the workpiece. These vibrations have generally a component which is perpendicular to the surface which is being machined. The frequency of the vibrations is the inherent or natural frequency of a mass system on which the cutting force acts and which consists of the machine tool, including the tool involved in the machining operation, and the workpiece which is being machined. The result is that the machined surface becomes wavy or rippled, the density with which the waves or ripples occur over a certain area on that surface being proportional to the inherent frequency of the aforementioned vibrating system. A chip, detached from the workpiece during a machining operation, will therefore have a cross-section which increases and decreases periodically with the frequency of the vibrations to which the vibrating system is subjected, even if the surface to be machined has initially been absolutely plane. When during continued machining of that surface, a tool passes over the waves or ripples formed thereon during a preceding run of the tool over that surface the vibrations in the vibrating system are reinforced and their amplitude is increased, as machining proceeds. Thus these amplitudes become gradually so large and the waves and ripples on the machined surface so pronounced that it is practically impossible to obtain surfaces of acceptable quality, apart from the severe wear of the tools and the adverse effect of the vibrations on the machine tool in general.

Numerous proposals have been made to reduce the regenerative chatter which occurs during the machining of a workpiece by a tool of a machine tool. One of these proposals consisted in increasing the damping of the vibrations in the vibrating system to such an extent that the amplitude of the vibrations became very small. This proposal has for instance been adopted in the case of boring bars whose rotating masses were increased for the purpose of damping the vibrations. However, in cases where the vibrating mass of the system consisted mainly of the workpiece, it was not possible to adopt the above measure, because it was difficult or impracticable to increase the mass of the workpiece for the purpose of damping vibrations.

Another proposal for reducing regenerative chatter consisted in reducing the feeding movment of the tool relative to the workpiece, but it has been found that this measure resulted in a very small decrease only of the regenerative chatter. There were, moreover, limits below which the feed could not be reduced for practical reasons. Reduction of the depth of the cut, made in the workpiece by the machining tool was likely to alter the desired contour of the workpiece and could therefore not be used for damping the vibrations, with the view of minimising regenerative chatter.

It is an object of the invention to provide a method by which regenerative chatter occurring during the machining of workpieces in a machine tool can be effectively reduced in a simple manner and without the drawbacks and deficiencies of the known proposals.

It is a further object of the invention to provide means which can be attached to a machine tool and which effectively reduce regenerative chatter.

The invention proposes to prevent regenerative chatter which occurs during the machining of a workpiece by a tool of a machine tool by changing repeatedly the cutting speed of the tool whilst the tool machines the same surface of the workpiece, thereby making the frequency with which the waves or ripples on the surface which is being machined impact on the tool dissimilar to the inherent frequency of the mass-system on which the cutting force acts, so that these waves or ripples when impacting on the tool do not increase the amplitude of the vibrations which produce chattering.

It is preferred to change the cutting speed of the tool at relatively frequent intervals so that there is no build-up of the amplitudes. The speed may be changed after each run of the tool over the surface which is being machined. When the invention is applied to a machine tool, in which the workpiece or tool rotates during machining, the speed may be changed at each revolution. It is further preferred for the changes of speed to be effected in opposite directions so that an acceleration follows a deceleration and vice versa in order to maintain a substantially constant average cutting speed during a succession of runs of the tool. Thus, during a turning operation in which the initial vibrations are only relatively small, the speed may be reduced by, e.g., 30 percent after the first revolution whereupon chatter marks on the machined surface impact on the tool at a frequency which is only 70 percent of the inherent frequency of the vibrating mass system. This difference in the two frequencies results in eliminating, to a large extent, the regeneration of the chatter. At the next revolution, the cutting speed is increased by 30 percent which again results in a suppression of the regenerative effect of the chatter marks.

The invention is applicable to machine tools of various kinds, including lathes and boring and milling machines.

In order to carry out the invention, a machine tool is equipped with a drive which moves a tool of the machine tool relative to the workpiece during a machining run, and whose speed can be varied whilst the drive is under load so that the speed at which the cutting edge of the tool detaches a chip from the surface which is being machined changes correspondingly. The changes in speed may either be made in steps or continuously. The required changes in the cutting speed are preferably effected by a speed controller which is associated with the drive of the tool and which permits the required changes to be carried out without any undue delay.

It is further preferred to provide a programmer which monitors to the controller the required changes in the cutting speed, in particular as regards their magnitude, timing and direction.

As the speed control means for the tool drive are only required whilst there is a risk of regenerative chatter occurring during machining of a workpiece they can be switched off either manually or automatically. In the latter case a sensing device may be provided which measures the intensity of the chatter by measuring the relative movement between workpiece and tool. The output of this device is utilized for operating the switch for the controller either directly or through the programmer. If desired, the device may also be utilized for setting and resetting the program in the programmer in response to the measurements taken by the device, so that the best possible results are obtained as regards the suppression of chatter.

A preferred embodiment of an apparatus according to the invention is shown diagrammatically and by way of example in the accompanying drawing.

The drawing shows a surfacing lathe consisting of a bed 1, a head stock 2 and a slide 3, supporting a cross-slide. The main spindle of the lathe is rotated by a drive, e.g., a d.c. motor 4, whose speed can be changed under load. A workpiece 6 is clamped at the head stock 2, to the main spindle, e.g., by means of a face plate 5. The cross slide carries a tool 7 which machines a plane surface on the workpiece 6.

In order to suppress regenerative chatter, the motor 4 is provided with a controller 8 for the motor speed, the controller being adapted to be monitored by a programmer 9 so that the speed of the motor 4 and thereby that of the workpiece 6 are changed in accordance with the program of the programmer. The changes in speed are such that they interrupt the process of regeneration of chatter.

The controller 8 may be switched on and off either by hand or by the programmer 9. However, it is preferred to provide for that purpose a special sensing device 10 which has a feeler 11, arranged on the lathe so as to indicate the occurrence of vibrations in the vibrating system, comprising the lathe with the tool 7, and the workpiece 6. In response to the measurements taken by the device 10, the controller 8 alters the cutting speed of the tool 7 as required for the suppression of chatter. The device 10 may be provided as a separate unit in addition to the programmer 9; it may also replace the latter in which case the controller 8 is switched on and off direct by the device 10.

The device 10 is operative to switch off the controller 8 when the vibrations decrease below a certain level and to switch on the controller when the vibrations exceed the level again.

The device 10 may be so modified that it sets and resets the program of the programmer 9 by means of the feeler 11 so that the most favourable results are obtained as regards the suppression of chatter.

What I claim is:

1. A machine tool comprising a tool support, a work support, means for mounting said support for relative rotation causing the tool to repeatedly machine the same surface of the workpiece on successive relative revolutions with a cutting speed depending on the velocity of said relative rotation, said workpiece, said tool and said supports thereof constituting a vibratory mass system in which said tool and said workpiece are capable of relative vibration at an inherent frequency causing said tool to produce ripples on said surface, of the work-piece, driving means for producing said relative rotation of said tool and said workpiece and control means connected with said driving means for repeatedly changing said velocity of rotation produced by said driving means, while said tool repeatedly machines said surface of the workpiece thereby making the frequency with which said ripples of said surface impact on said tool dissimilar to said inherent frequency so that said ripples when impacting on said tool do not increase the amplitude of said vibration.

2. A machine tool as claimed in claim 1 further comprising a programmer connected with said control means for monitoring to said control means the magnitude, timing and direction of the repeated changes of the velocity of said driving means.

3. A machine tool as claimed in claim 1 further comprising sensing means connected with said vibratory mass system to sense the vibration thereof, said sensing means being connected with said control means to influence the operation thereof.

4. A machine tool as claimed in claim 3 in which said sensing means is mounted on said tool support.

5. A machine tool as claimed in claim 3 in which said sensing means is provided with means for rendering said control means operative, when the vibrations exceed a certain level and for rendering said control means inoperative, when said vibrations decrease below a certain level.

6. A machine tool as claimed in claim 3 in which said sensing means is connected with said programmer for influencing the operation thereof in dependence on the intensity of said vibrations.

7. A machine tool as claimed in claim 1 constituting a lathe, said work support being the work spindle of said lathe.

* * * * *